United States Patent [19]

Claesson et al.

[11] Patent Number: 4,773,029

[45] Date of Patent: Sep. 20, 1988

[54] METHOD RELATING TO THREE DIMENSIONAL MEASUREMENT OF OBJECTS

[76] Inventors: Jon Claesson, Lerdalsgt. 8c, N-2010 Strommen; Jack R. Hoifodt, Ekravn. 68e, N-0756 Oslo 7; Einar Sorensen, Sloreåsen 42c, N-1257 Oslo 12, all of Norway

[21] Appl. No.: 9,341

[22] PCT Filed: Apr. 30, 1986

[86] PCT No.: PCT/NO86/00034

§ 371 Date: Dec. 23, 1986

§ 102(e) Date: Dec. 23, 1986

[87] PCT Pub. No.: WO86/06473

PCT Pub. Date: Nov. 6, 1986

[30] Foreign Application Priority Data

Apr. 30, 1985 [NO] Norway .................... 851718

[51] Int. Cl.[4] ............... G01B 11/04; G01B 15/00; G01B 21/06; G01F 25/00
[52] U.S. Cl. ........................ 364/562; 364/564; 364/571.01; 356/380; 356/38.6; 250/359.1
[58] Field of Search ............. 364/560, 561, 562, 563, 364/564, 571; 356/380, 386, 387, 379; 250/560, 222.1, 223 R, 224, 359.1, 360.1; 73/1 H, 1 R, 1 J

[56] References Cited

U.S. PATENT DOCUMENTS

| | | | |
|---|---|---|---|
| 3,436,968 | 4/1969 | Unger et al. | 73/433 |
| 3,513,444 | 5/1970 | Henderson et al. | |
| 3,588,480 | 6/1973 | Unger et al. | |
| 3,806,253 | 4/1974 | Denton | |
| 4,645,080 | 2/1987 | Scopatz | 250/223 R |
| 4,687,107 | 8/1987 | Brown et al. | 364/564 X |

FOREIGN PATENT DOCUMENTS 425126 8/1982 Sweden .
1555874 11/1979 United Kingdom .
2078937 1/1982 United Kingdom .

*Primary Examiner*—Tom Noland
*Attorney, Agent, or Firm*—Browdy and Neimark

[57] ABSTRACT

A method for three dimensional measurement of objects being conveyed through or moved relative to a measurement frame for, by incremental measurements of height, width and length of the object to calculate cubical and circumscribed volume of the object. Each transmitter/receiver element pair of the measurement frame is calibrated by controlling the amount of the light emitted from the transmitter and the threshold level of the receiver, such that the signal/noise ratio of the receiver lies above a specific limit, simultaneously with the illumination time being kept the shortest possible. By incremental measurements at least one pair consisting of transmitter element and directly opposite receiver element in the measurement frame is activated at time, and an external signal being a function of the movement of the object relative to the measurement frame is compared with the registered signals from the receiver elements for calculation of the volumes. The measurement frame is constructed in the form of horizontal and vertical transmitter- and receiver modules consisting of the transmitter elements and receiver element respectively. A computer is connected to the measurement frame for calibration of the respective transmitter- and receiver elements of the measurement frame and for calculation of the volumes being derived as a result of shadow images of the object on the receiver elements. A display is associated with the computer for display of the volume magnitude of the object. Utilization for e.g. calculation of freight charges of objects.

19 Claims, 12 Drawing Sheets

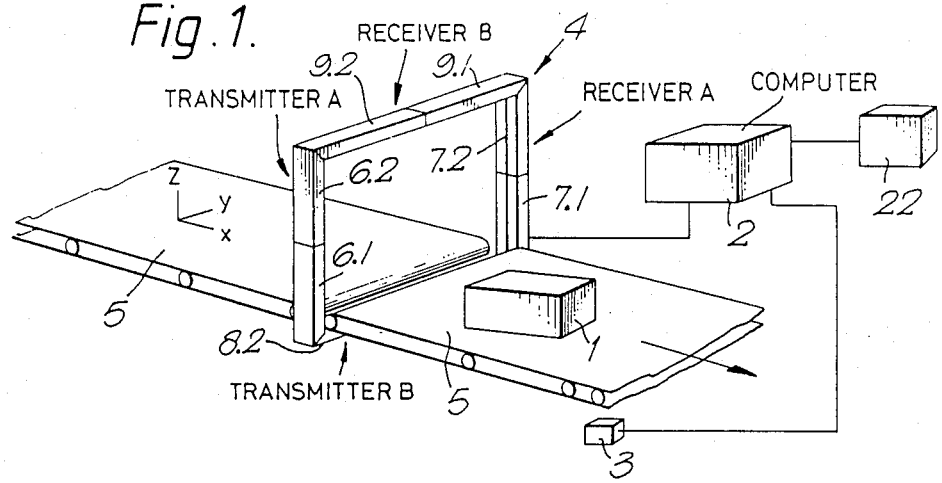
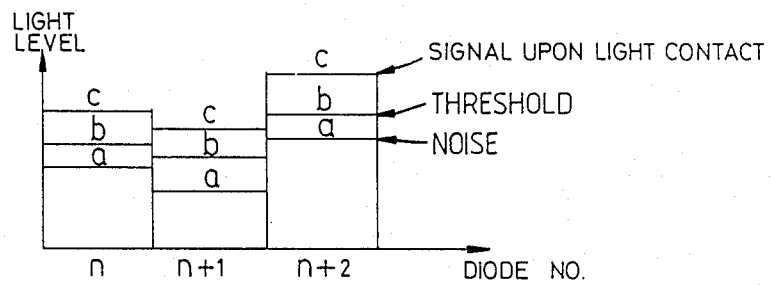
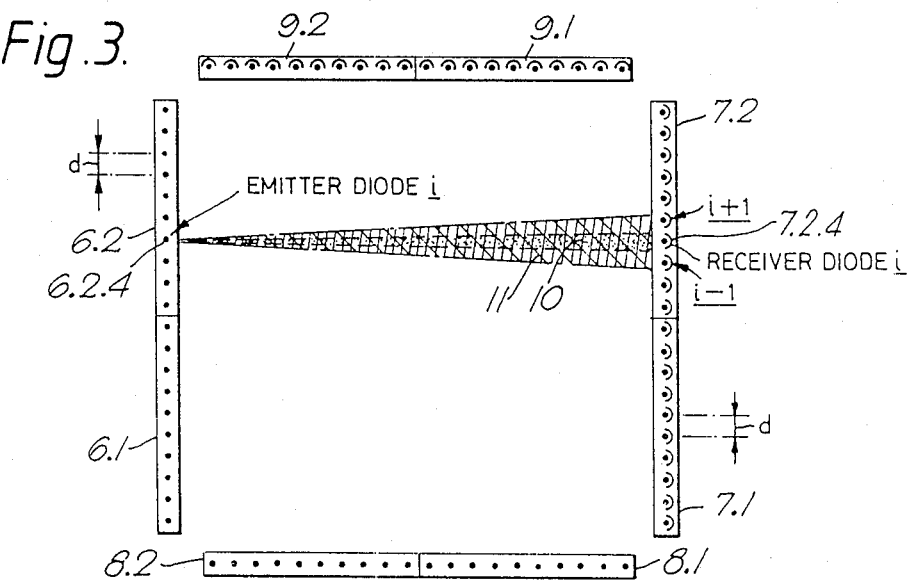

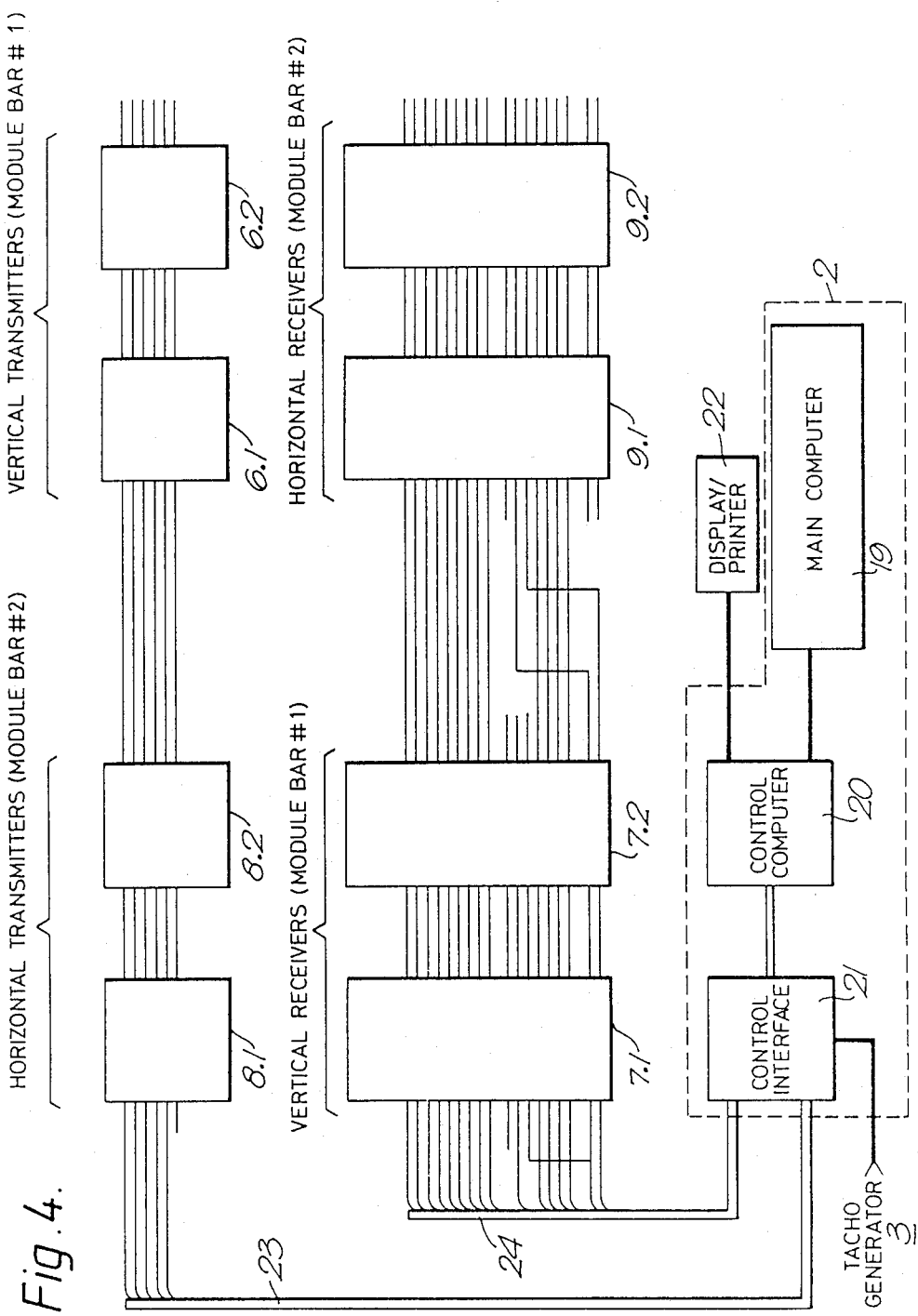

FREQUENCY CHARACTERISTIC

PHASE CHARACTERISTIC

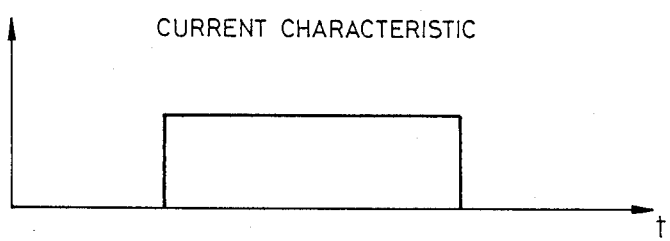
Fig.17a. CURRENT CHARACTERISTIC
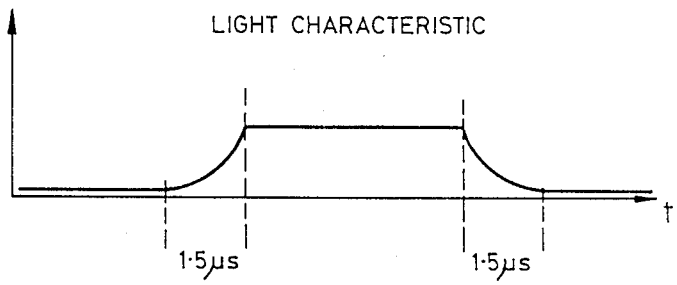
Fig.17b. LIGHT CHARACTERISTIC
1·5μs   1·5μs
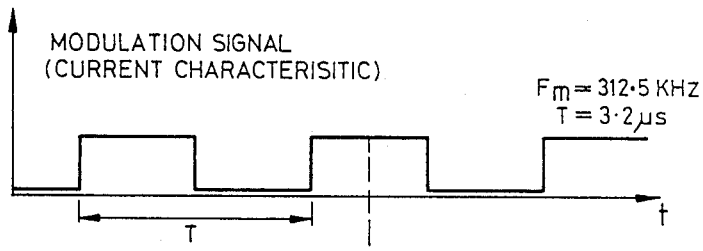
Fig.17c. MODULATION SIGNAL (CURRENT CHARACTERISITC)
Fm = 312·5 KHZ
T = 3·2μs
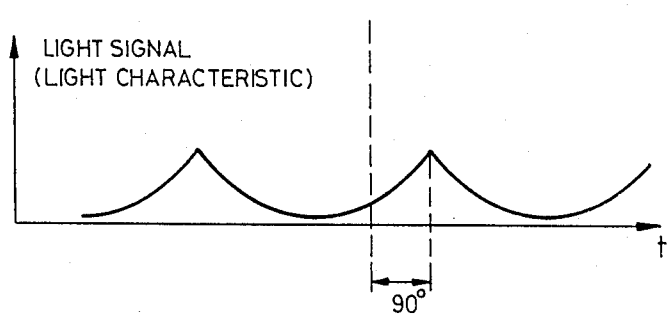
Fig.17d. LIGHT SIGNAL (LIGHT CHARACTERISTIC)
90°

METHOD RELATING TO THREE DIMENSIONAL MEASUREMENT OF OBJECTS

BACKGROUND OF THE INVENTION

1. Field of the Invention

The present invention relates to a method for three dimensional measurement of objects being conveyed through a measurement frame for calculating the volume of the object by means of incremental measurements of height, width and length of the object. By volume is here considered both cubical volume and circumscribed volume.

2. The Prior Art

A system is known from U.S. Pat. No. 3,513,444 for determination of the volume of any object moving along a given path. The calculation of volume is effected by measuring height and width for each incremental distance which the object advances in the direction of conveyance. Upon each measurement there is thus calculated an incremental volume. A signal is provided to indicate that the object has moved the incremental distance in the direction of conveyance when a pulse generator, which may be connected to the drive system of the conveyer has provided a specific number of pulses being counted by a counter circuit. The total volume will thus be given the sum of the incremental volume measurements. This known system makes use of a number of parallel light rays in horizontal and vertical directions. Together the light rays form a right angled matrix. Opposite to the horizontal and vertical light sources, respectively, are located the same number of photocells. That number of photocells in the light matrix not receiving light, will thereby determine the height and width of the object at the actual location. The calculated volume is according to the patent, the real volume, whereas within the transport terminology one operates with cubical volume, defined by the product of the greatest height, length and width. The indicated solution does not provide storage of sufficient number of data to make it possible to calculate the cubical volume of the object in any one orientation thereof. The solution indicated by the U.S. Pat. has a further substantial limitation in that one dimension of that object which is to be measured always must be moved parallel to the direction of conveyance. This results in a substantial limitation with respect to utilization. U.S. Pat. No.3,588,480 and U.S. Pat. No. 3,436,968 disclose a system for retrieving data being representative of the volume of an object moving along a specified direction. For measurement of the dimensions of the object across the direction of movement, there is used a larger number of light emitters being mounted to form a matrix of parallel light rays. The dimension of the object in the direction of movement is determined by measuring its velocity and the time it is present within the light matrix. Constant light is emitted the whole time from the light matrix. According to the patents the systems thus described are able to measure both the real and cubical volume of the object. The cubical volume is derived by multiplication of the maximum linear dimensions in each direction of the object. In order to enable this in a simple manner with the described electronics, it is required that the object is orientated with its largest length/width parallel to/across the direction of movement. It is indicated that the orientation of the object on the conveyor is immaterial per se, however, without indicating how the volumes in such case are calculated.

Swedish Pat. No. 425,126 discloses a method for the detection of the presence of an object within a measurement area, and measurement of its cross section in the measurement plane. For accurate measurement of dimensions it is assumed that the crossection of the object is approximately circular, e.g. a log. The measurement apparatus includes a device consisting of two arrays each having a number of transmitters and receivers. The measurement area is defined as the plane between the two arrays. Each array consists of a number of transmitters and a smaller number of receivers. If the distance between the receivers is $\underline{D}$ and there are the number s of transmitters between each receiver, it is possible to obtain a measurement accuracy of $\pm D/2s$. By means of a described dual receiver, the accuracy is claimed to increase to $\pm D/4s$. The disclosed geometry with larger distances between the receivers than between the transmitters renders the measurement system completely unsuitable for objects having a crossection departing substantially from that of a circle.

The present invention aims at providing an improved method for three dimensional measurement, rendering it possible to calculate therefrom both cubical volume and circumscribed volume, irrespective of the orientation of the object on the conveyor belt. The present invention aims in particular to provide a solution whereby an automatic adaptive calibration of the measurement system, automatic error detection and signal processing with improved measurement accuracy are enabled. In addition, the invention aims at the use of system components having relative modest requirements to tolerance values.

As a further object of the invention there is intended to provide modular construction of the measurement frame, in order that the present invention enables simple "tailor-made" solutions for dimension measurement of objects within the different volume ranges. Such modular construction will also facilitate trouble-shooting and repairs.

BRIEF DESCRIPTION OF THE DRAWINGS

The features of the method according to the present invention will appear from the subsequent patent claims as well as from the subsequent description with reference to the attached drawings.

It is readily understood that the subsequent description is only meant to illustrate non-limitative, preferred examples of the invention.

FIG. 1 illustrates schematically the measurement device according to the invention, with measurement frame and conveyor belt.

FIG. 2 illustrates a first calibration method for the measurement device.

FIG. 3 illustrates, as a non-limitative example, the measurement frame being constructed of a total of 8 modules.

FIG. 4 shows, partly in block diagram form, partly in circuit form the device according to the present invention.

FIG. 17 illustrates in FIGS. 17a and b, respectively, the current characteristic and the light characteristic of an emitter diode, whereas FIGS. 17c and d illustrate modulation signal and light signal, respectively.

DETAILED DESCRIPTION OF THE PREFERRED EMBODIMENT

Figure 5A:
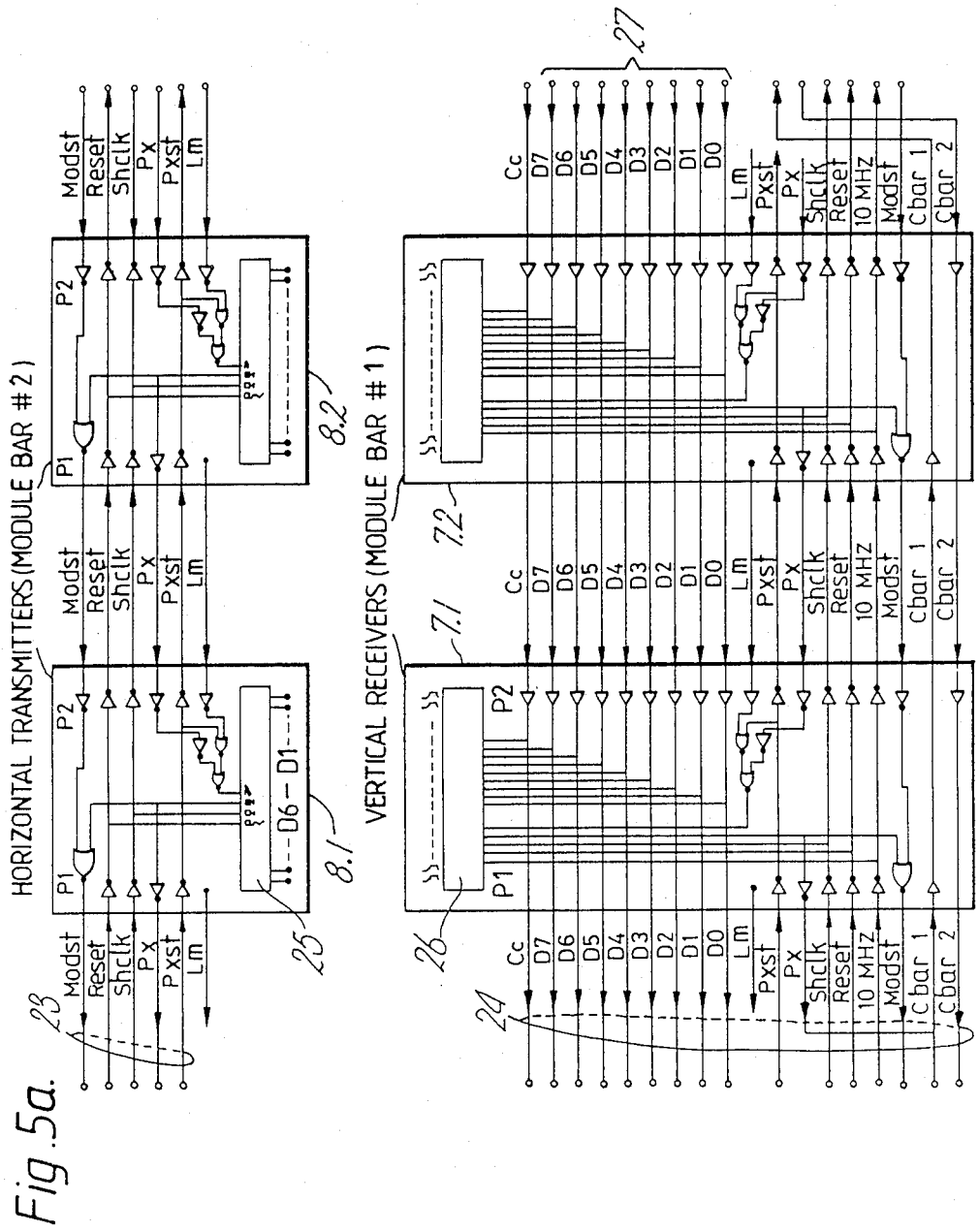
FIGS. 5a and 5b disclose in further detail the transmitter and receiver part of the measurement frame of FIG. 4.

The present invention aims at providing a method for measurement of the volume of all types of cargo items, where all three dimensions can be measured with sufficient degree of precision to let the values be used as basis for example calculation of freight charges. The technology requires that during measurement there be relative movement between the object and the measurement system, either by having the object moving or the measurement system moving.

Basically, the device being used for carrying out the method is designed as a frame where the objects to be measured are brought therethrough with a velocity which can be measured relative to the frame. An example thereof is a divided conveyor belt 5 as suggested in FIG. 1. The frame exhibits two transmitters and two receiver sides, 6, 8 and 7, 9 respectively. According to FIG. 1 a transmitter/receiver unit, e.g. 6, 7 will be capable of measuring one dimension of the object 1 which is to be passed through the measurement frame. According to FIG. 1, the dimension of the object 1 in z-direction is measured by the transmitter/receiver pair A, whereas the dimension in y-direction is measured by the transmitter/receiver pair B. The third dimension, x-direction, is measured simultaneously with the transmitter/receiver pair A and B, respectively, being read for each movement $\Delta x$ which the object has moved in the x-direction. The pairs of detectors A and B will thus register where the object starts and where it is terminated. The difference provides the dimension of the object in x-direction. The method necessitates the installation of a velocity meter (tachometer) 3 providing a signal when the object 1 has moved a length $\Delta x$ relative to the measurement system.

Although it is shown in FIG. 1 that the object 1 to be measured moves relative to the measurement frame 4 by means of the conveyer 5, it will, by an expert in the art, immediately be understood that the object 1 possibly could be stationary, and the measurement frame could move relative to the object instead.

The present invention has as a substantial feature that the device for carrying out the method can be constructed in modular fashion, thus making the total size of the measurement frame easily adaptable to different requirements as regards dimensions of the objects to be measured. In the example shown in FIG. 1 the transmitter A consists of two modules 6.1, 6.2, the receiver A of two modules 7.1, 7.2, the transmitter B of two modules 8.1, 8.2, only the latter of which is depicted in FIG. 1, and receiver B of two modules 9.1, 9.2.

Each transmitter and the opposite receiver therefore consists of one or several modules, each module having a length L. Thus, the total length of each transmitter is $n \times L$, where n is an arbitrary integer equal to or larger than 1. The modules may be identical for transmitter and receiver, respectively, and interconnected in a number necessary for the measurement tasks to be carried out. A computer 2 which processes the measurement data is not required to be programmed to handle a fixed number of modules. The computer is able to transmit test pulses, and based on returned signals, it is recorded how many modules each transmitter and receiver are composed of. This enables a simple and cost efficient structure, where different requirements to measurement ranges are met simply by putting together the required number of modules for the respective receivers and transmitters.

The invention is now to be explained further with reference to FIG. 3. In the transmitter modules 6.1, 6.2; 8.1, 8.2 there are installed discrete light emitters, e.g. IR-diodes having a mutual spacing $d$. In the receiver modules 7.1, 7.2; 9.1, 9.2 there are installed a corresponding number of light detectors, e.g. photo transistors or photo diodes, similarly with a mutual spacing d.

By letting only one transmitter $i$ and a corresponding receiver $i$ be active simultaneously, it is guaranteed that measurements take place along parallel lines. In FIG. 3 the transmitter 6.2.4 and the corresponding receiver 7.2.4 have been selected as an example.

Thus, from the transmitter side light energy 10 is emitted and detected on the receiver side. Objects passing through the measurement frame will partly shadow this radiation, and incremental shadow images will thus be detected on the receiver side. A receiver is only sensitive to the light energy from the transmitter lying right across in that the respective light detectors or receivers are activated at different instants, e.g. successively, and simultaneously with the opposite transmitter- or light diode.

By the present invention it is intended signal processing be provided having improved measurement accuracy.

It is essential that the contact by light which is present between a single light emitter and a single light detector becomes unambiguous. This may be solved in two ways, of which a first one is illustrated in FIG. 2. The concept here is that the receiver detector measures the absolute value of the light level at the receiver location. If the light level $c$ lies higher than a threshold $b$ calibrated individually for each light diode, then there is contact by light between transmitter and receiver. However, one may experience, as illustrated, that the signal/noise ratio may be quite different dependent on the quality of the individual light emitter and the corresponding light detector, in the example shown indicated for three diodes n, n+1 and n+2.

On the basis of measured light intensity upon complete shielding and measured light intensity without shielding, a discrimination level IT may be determined for the light emitter/light detector pair. By measurement of absolute value it is intended to obtain an automatic adaptive calibration of the measurement system. This also requires that there is a certain minimum distance between an object and a subsequent object which are to pass through the measurement frame 4. As soon as an object 1 has passed through measurement frame 4, the system will be entered into an adaptive calibration function such that each light emitter/light detector in the respective transmitter/receiver pair A, B is controlled and calibrated.

On basis of said measurement, a discrimination level may be calculated with the aid of a computer 2 which under normal operation is used to determine whether a receiver is shielded or not shielded. The discrimination level IT will thus be determined by the equation:

$$IT = ID + k(IL - ID),$$

where k is a selected constant having a value $0 < k < 1$, ID is equal to measured intensity with complete shielding, and IL is equal to measured light intensity without shielding.

This solution, even though it provides excellent results, can however cause, as mentioned, the signal/noise ratio to become poor, whereby, in disadvantageous cases, the possibility of incorrect measurements may be present.

In order to thereby calibrate the respective transmitter/receiver pairs individually or in groups, however, according to the invention, the solution described below is preferred. The object of calibrating light emitter/light detector pairs is of course to obtain optimum control of the signal/noise ratio and the total detection time for the light detector (receiver), in order to keep the signal/noise ratio as high as possible, while the detection time is intended to be kept as short as possible.

The threshold value on the receiver part comparator circuit, and the total illumination time (integration time) from the respective light emitter (transmitter) are used as control parameters. The illumination time for each light emitter/light receiver pair is added to total time T for the complete measurement frame 4, where $$T = \sum_{i}^{N} t(i),$$

t(i) being the illumination time for light receiver no. i and N being the total number of light emitter/light receiver pairs in the measurement frame. The lower the time T, the more often the measurement frame may be scanned, and the more rapid the object to be measured can pass through the measurement frame. Typically, it should be required that t(i) on average should be less than 20 microseconds.

In order to improve the signal/noise ratio the invention makes use of modulated light from the transmitter diodes. The transmitter diodes may for example, be IR-diodes. The modulation frequency is denoted Fm. The modulation and the associated electronics contribute to reduction of both optical and electrical noise at the receiver modules.

Unwanted light (optical noise) from other light sources, such as sun light, room lighting or the like is eliminated, as the light detectors in the receiver modules are modestly sensitive to light having other modulation-frequencies than Fm. Basically, the modulation will generate electrical noise in the frame, partly due to distribution of high-frequency modulation frequency over long lines, typically 1-3 meters, partly because large amperage in the individual transmitter elements or light emitters, typically 0.5-1.0 A, are turned off and on with the same frequency.

Figure 13:
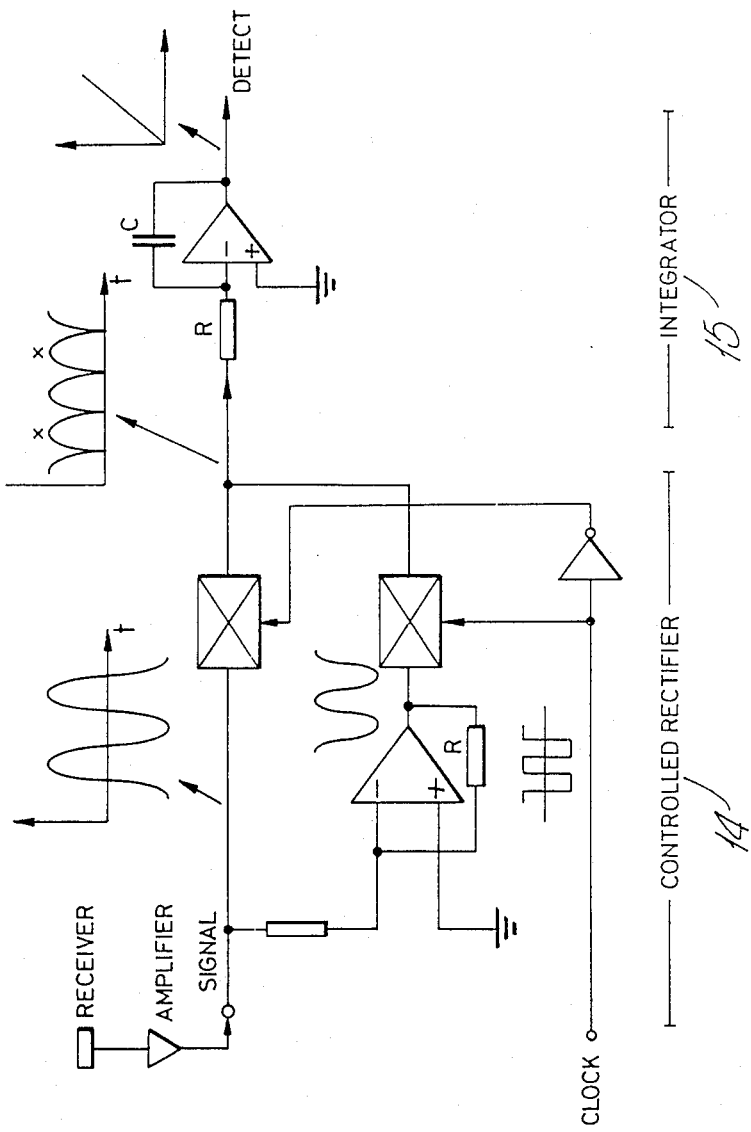
FIG. 13 illustrates in block schematic form a receiver module in the measurement frame for carrying out synchronous modulation and demodulation.

In order to save time, synchronous modulation and demodulation of the light emitters and light receivers, respectively is provided. In principle the modulation frequency is distributed in principle in the measurement frame 4 to all light emitters and light receivers. At the receiver side there is used a controlled rectifier and integrator, such as indicated in FIG. 13. These have four good properties, viz:

that the phase-in time for the demodulator is eliminated, due to the modulation frequency being distributed, that the detected signal in the receiver elements increases linearly with time, that detected signal in the receiver elements increases linearly with light intensity of the modulated light, and that noise having other frequencies and phase relationships than the modulation signal is suppressed according to the filter characteristics of the demodulator.

Figure 14:
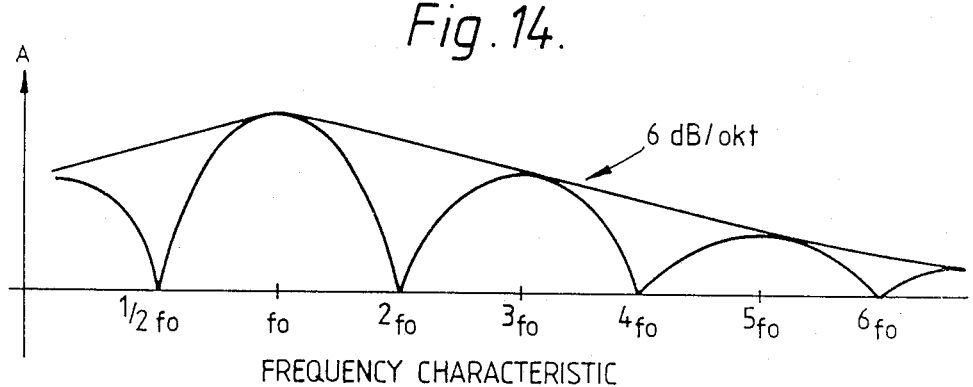
FIGS. 14 and 15 illustrates the filter characteristic of the circuit depicted in FIG. 13, FIG. 14 illustrating the frequency characteristic and FIG. 15 the phase characteristic.
Figure 15:
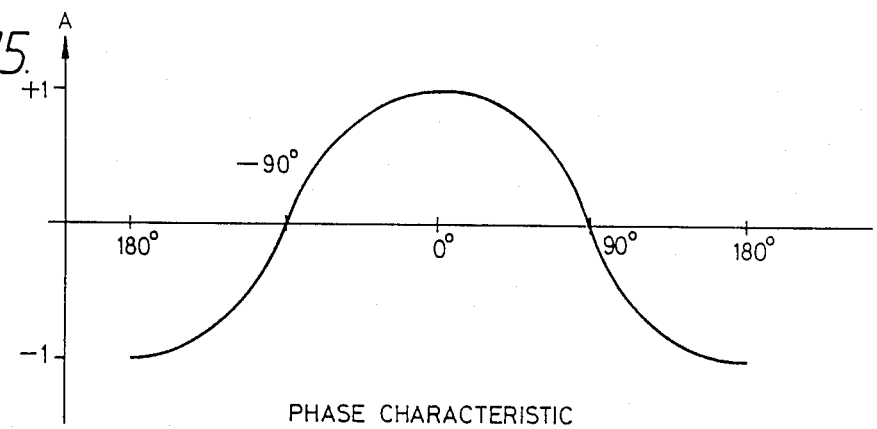

The filter characteristics of the demodulator have been indicated in FIG. 14 and FIG. 15, respectively. From these filter characteristics it can be derived that the filter renders the receiver insensitive to noise of frequency being the double of the modulation frequency Fm. In addition the filter renders the receiver insensitive to noise with frequency equal to Fm, but with phase shift of 90 degrees.

Both of these properties are used to improve the signal/noise ratio for the respective light receivers in the receiver modules.

Figure 16:
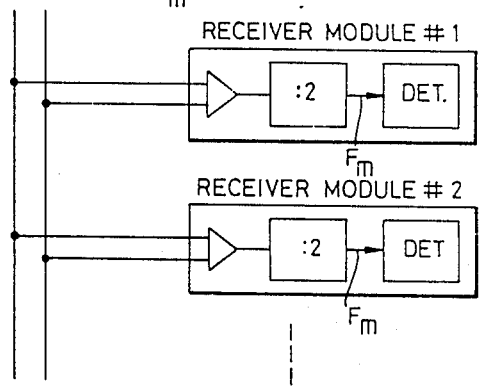
FIG. 16 illustrates in simplified block circuit form distribution of the modulation frequency.

Instead of distributing modulation frequency Fm over long lines throughout the measurement frame, the double frequency $2 \times Fm$ is distributed. As indicated in FIG. 16, this frequency ($2 \times Fm$) is divided by 2, geographically speaking, as close to the demodulator (FIG. 13) as possible, in order to obtain shortest possible wiring of the signal frequency Fm. The transmitter diodes being used may have rise and fall time of typically 1.5 microseconds for light emission. This has been indicated in FIG. 17b, in connection with the current characteristic of the transmitter diode. By applying a modulation frequency Fm=312.5 kHz, to the diodes, the light emission from the diodes will be delayed 90 degrees relative to the electrical modulation signal, as clearly appears from FIGS. 17c and d. The demodulator (FIG. 13) is set to maximum sensitivity for the light signal. This yields, according to the above, that the demodulator becomes insensitive to noise caused by switching of large amperages to the transmitter diodes.

The measurement frame registers contact by light between a light emitter/light receiver pair by comparing the signal from a light receiver with a threshold level. This level can be set individually for each receiver element or may be common to a group thereof.

Three variables are involved during calibration:
1. The intensity of emitted, modulated light.
2. The integration time.
3. Threshold level in the receiver-electronics.

Of these three, the variable (1) will be different from diode to diode, but for one and the same diode the light intensity will be almost constant. However, ageing and dust deposit may over time reduce the intensity, but the calibration will automatically compensate therefor.

Figure 19A:
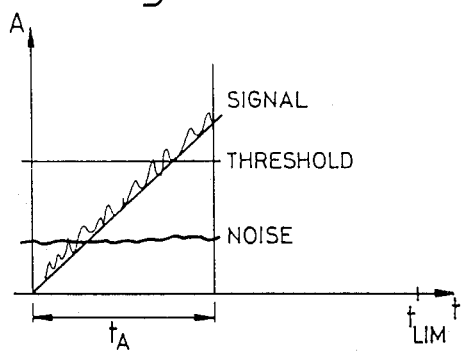
FIGS. 19a and 19b illustrate for a good and a bad receiver diode, respectively, the preferred solution where integrated energy of the received signal and a specific frequency and phase is caused to lie above a specific fixed threshold.
Figure 19B:
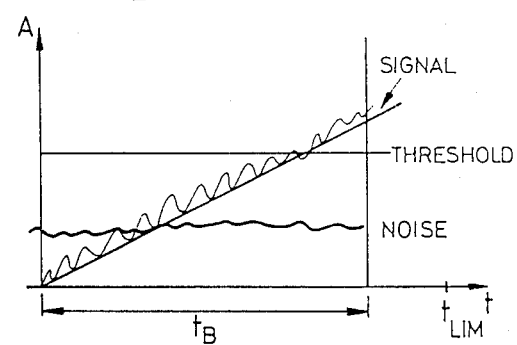

During calibration there is initially selected a threshold value securing sufficiently high signal/noise ratio for the receiver element. Thereafter the transmitter element is activated until the receiver element detects signal reaching the threshold value. It is in this connection referred to FIGS. 19a and 19b illustrating signal/-noise ratio relative to threshold for a good and a bad diode, respectively. The threshold level is reached after N(i) light pulses from transmitter element no. i. For normal use there is selected an integration time t(i), where:

$$t(i) = (N(i) + K)/Fm,$$

Figure 20:
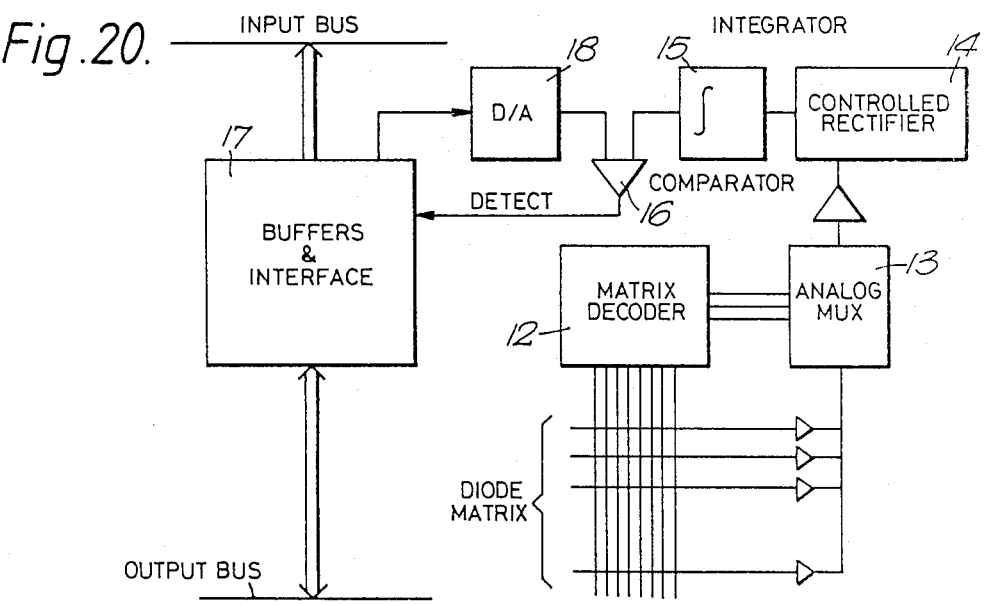
FIG. 20 illustrates a typical receiver module according to the invention.

K being safety surplus in order that received signal will lie well above the threshold value when the light path is not shielded. If $\Sigma t(i) > TMAX$ for a group of transmitter/receiver element pairs, the control unit 20 (see FIGS. 4 and 6) will automatically reduce the threshold level and thereafter carry out a new time calibration. This is repeated until $\Sigma t(i) < TMAX$. This method implies that good transmitter/receiver element pairs use short illumination time, see FIG. 19a whereas less good transmitter/receiver element pairs (see FIG. 19b) use longer illumination time in order to obtain the same integrated signal strength. The total time being used is kept under a set limit, TMAX, by also controlling the threshold values. Those of the receiver elements not detecting signal above the threshold value for a maximum permissible integration time $t_{LIM}$, are defined as defects. It is in this respect referred generally to the circuit shown in FIG. 20 where a matrix detector 12 associated with an analog multiplexer 13 obtains signals from the receiver elements successively, the signals from the respective light detectors being applied to a controlled rectifier 14, therefrom to an integrator 15 (see FIG. 13) where the detected signal appears by a comparison with signals from a buffer and interface unit 17 through a D/A-circuit 18 in a comparator 16.

Figure 5B:
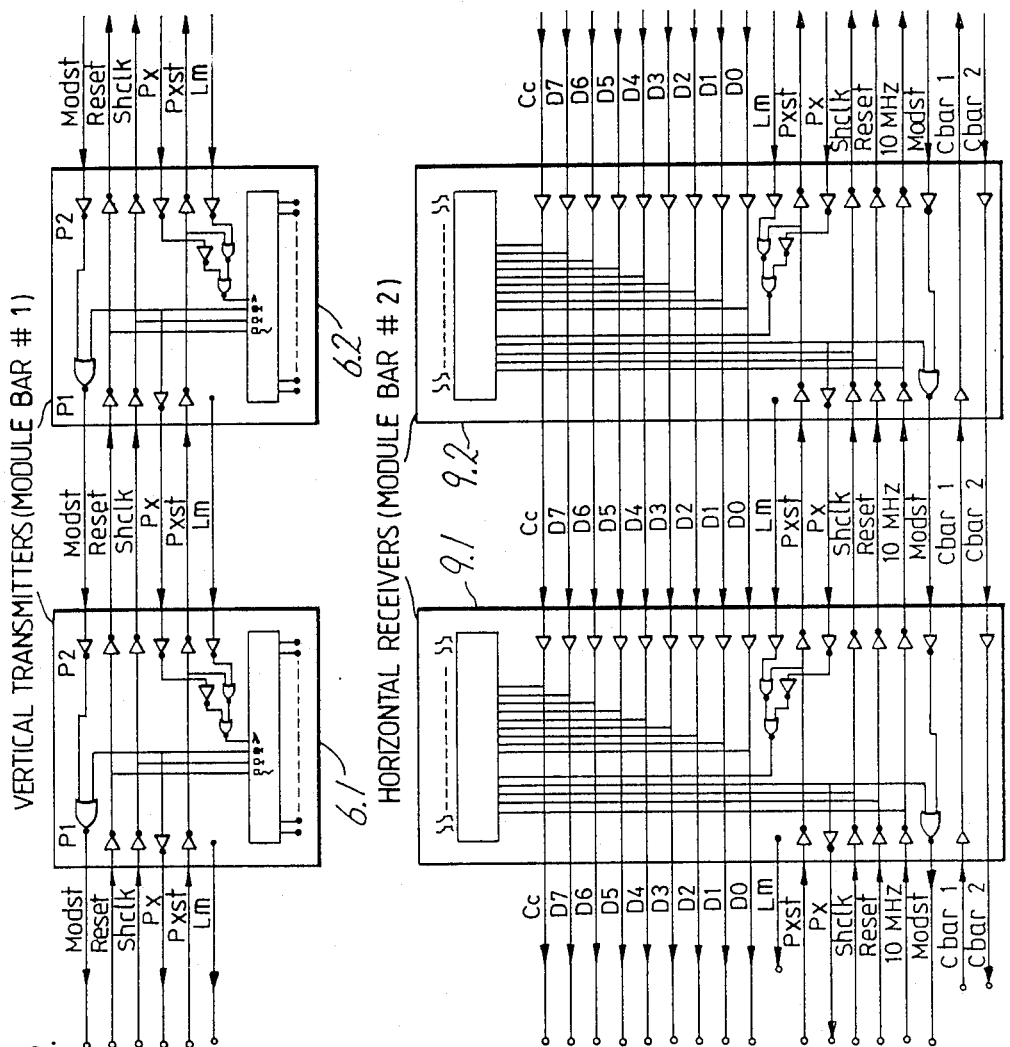
Figure 6:
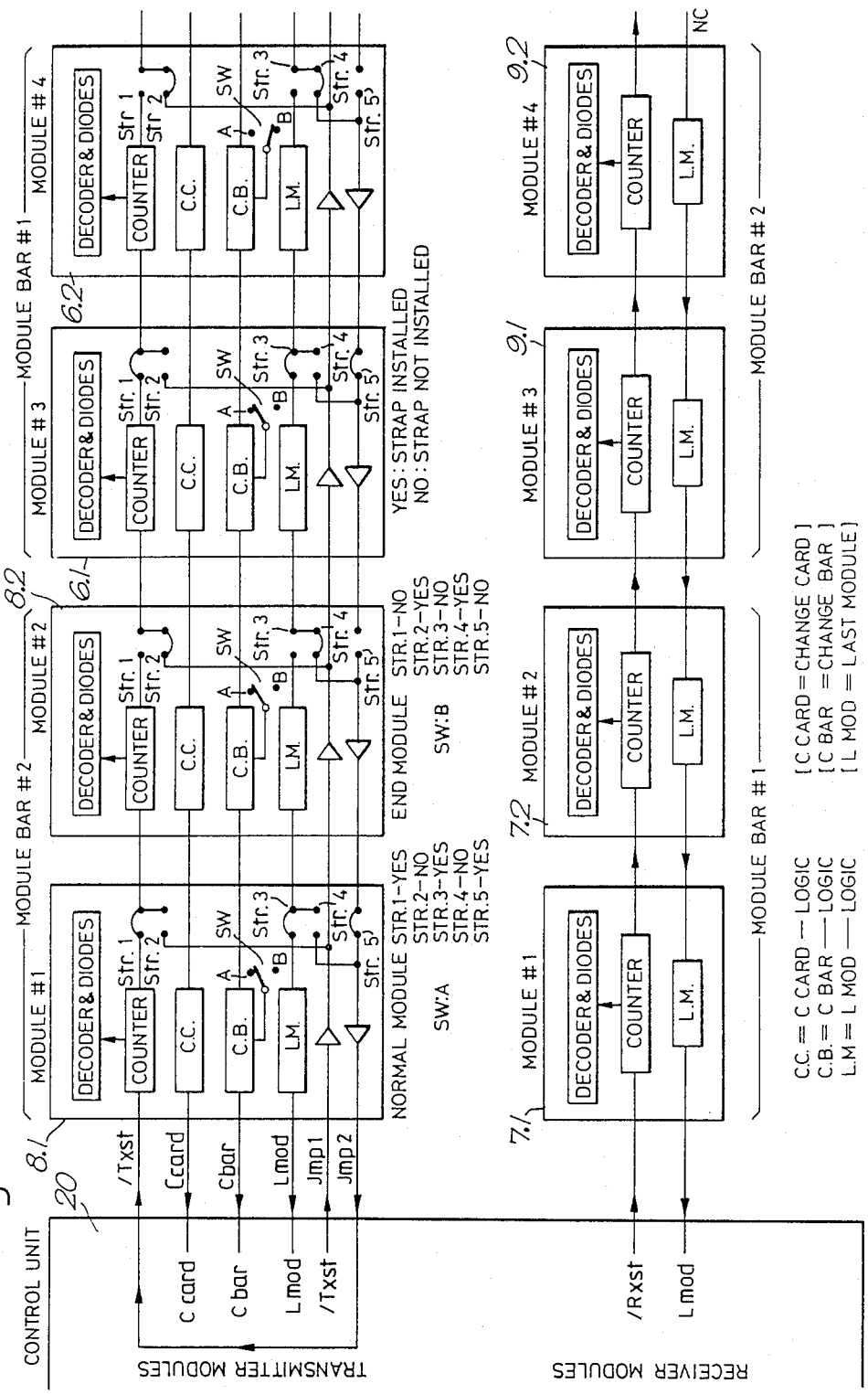
FIG. 6 illustrates in simplified block diagram an alternative solution for the transmitter and receiver part of the measurement frame, according to the invention for further elucidation of the principle of self-configuration of the measurement frame.
Figure 18A:
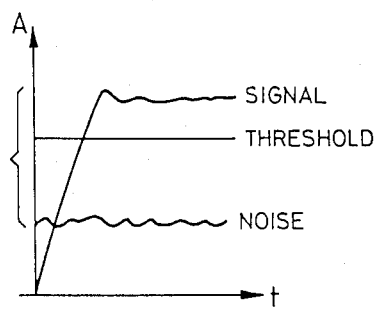
FIGS. 18a and 18b illustrate the signal/noise ratio in connection with a good and a bad receiver diode, respectively, the receiver diode measuring the absolute value of the level of light at the receiver location.
Figure 18B:
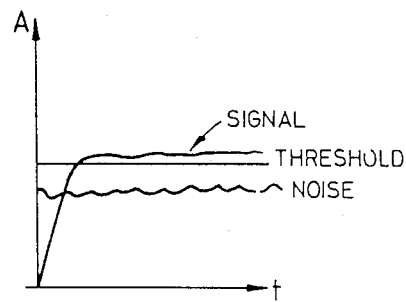

From FIGS. 18a and 18b representing signal/noise ratio relative to threshold for good and bad diode pairs, respectively, in connection with the embodiment according to FIGS. 4 and 5, it is clearly noted that the signal/noise ratio for a bad diode is reduced relative to what is obtained by the preferred embodiment according to FIG. 19b, which refers to the embodiment shown in general in FIG. 6.

In order to make use of the complete time being available, the signal is added in the integrator 15 over the available time period. As will appear from FIGS. 19a and 19b, the signal increases linearly with time, i.e. with a gradient being dependent on the signal strength. By this indicated solution, the set requirements to speed are satisfied in that the lock-in time of modulated systems is avoided. Further, there is provided a signal increasing linearly with signal strength and time. In addition, the contribution from noise having other frequency- and phase relationships is reduced due to the filter characteristics of the demodulator. With the present solution a weak diode pair will thus be compensated by increasing the integration time, whereby the emitted light energy is increased. A weak diode pair will therefore be able to detect with the same signal/noise spacing as a good diode pair.

The automatic calibration, as indicated above, enables the system, according to the invention, without measures taken by an operator, to adapt to the following non-ideal conditions:

variations in light intensity from the transmitter elements, e.g. as a result of component tolerance or difference in component type;

sensitivity variations at the receiver elements, likewise due to component tolerances or component type;

different response from the receiver elements as a result of the light ray from a transmitter element not being directed with intensity maximum exactly against the corresponding receiver element;

utilization of transmitter elements and receiver elements of different make and qualities within the one and same measurement system; the effect of varying background illumination due to sun light, artificial lighting or other conditions arising between the measurements; and the effect of dust collection or other conditions reducing the amount of light reaching the receiver elements.

As the calibration is made frequently, i.e. between the measurement of each object, all those conditions that may alter the transmission of light from a light emitter to light receiver (e.g. dust collection) will be taken care of by the computer. Further, product variations in the respective transmitter/receiver element pairs will automatically be taken care of.

The adaptive adaptation also results in that precise alignment of each transmitter/receiver pair of the module is not necessary, as long as the received amount of light from the transmitter elements is not too small, i.e. lies within the threshold value.

A further characteristic of the invention is that, if required, it may be determined whether it is the transmitter element or the receiver element which is defective, and such determination can likewise be made in connection with the adaptive adaptation by making, in addition to the normal calibration scanning (where receiver element no. $i$ detects light from transmitter element no. $i$) a scanning where the receiver element and transmitter elements are mutually phase shifted, e.g. where receiver element no. $i+1$ or $i-1$ detects light from transmitter element $i$.

This automatic fault detection, which may be incorporated in the adaptive adaptation of the measurement system, is initiated by a separate algorithm in connection with the computer 2 controlling such that all transmitter elements/receiver elements function satisfactory. Possible faults can be localized accurately to the actual transmitter- or receiver element.

During a control measurement a transmitter element $i$ is lit and the opposite receiver element $j$ is read. Such control measurement is carried out for all of the transmitter/receiver element pairs of the corresponding modules.

If the first control measurement provides as a result, that one or several receiver elements are not detecting sufficient light, this will accordingly indicate fault either on a transmitter element $i$ or corresponding receiver element $j$.

In order to determine whether the fault is caused by defective transmitter- or receiver element, a new control measurement is made. When the transmitter element i is activated, the receiver element j is read, the receiver element j being the closest receiver which with certainty functioned during the first control measurement. Due to dispersion of light, the receiver element j will also receive light from the transmitter element i, if it is lit, as indicated by the reference numeral 11 in FIG. 3. In the selected example, j may thus be denoting receiver element i−1 or i+1.

If the receiver element j detects sufficient light, the system will thus be able to report that receiver element i is defective. If, however, receiver element j does not detect sufficient light when transmitter element i supposedly is lit, the system will accordingly report that the transmitter element i is defective.

This self-test function will thus be of great value with regard to simple repair and maintenance of the measurement system.

By the adaptive adaptation, the problems which are a result of varying background illumination will be eliminated.

The present device is now to be explained further with reference to FIG. 14 and FIGS. 5a and 5b, FIGS. 5a and 5b having to be viewed together for a complete understanding of the operation of the measurement frame.

As with the previous examples, the horizontal transmitters consist of two modules 8.1 and 8.2, the vertical transmitters of modules 6.1 and 6.2, the horizontal receivers of modules 9.1 and 9.2, and the vertical receivers of modules 7.1 and 7.2.

The computer 2, as indicated in FIG. 4, consists of a main computer 19, a control computer 20 and a control interface 21. A display 22 is connected to the computer 2 through the control computer 20.

A transmitter data bus 23 and a receiver data bus 24 extends out from the control interface 21. In addition, there is supplied an input signal from the tacho generator 3 (see FIG. 1) to the control interface 21. As previously mentioned the measurement system may be composed of 1 to n modules horizontally and/or vertically. The system will self-calculate the number of modules and the resolution within each module, and defined how large the measurement axis is in horizontal and vertical directions, respectively. Although in the present example, for the sake of simplicity, two modules have been chosen for each axis, a different number of modules along the two axes, could of course be provided but it is a presupposition that there is an equal number of transmitter and receiver modules in each axial direction.

The description below will best be understood with reference to the enlarged circuit diagrams according to FIGS. 5a and 5b.

Firstly, the operation of the transmitter modules is to be explained. The transmitter modules have the following control lines: Reset, Shclk, Pxst, Px, Modst, Lm.

The signal Reset is used to stop all emission of light in all of the modules, and resetting all counters and control logic in the module.

The signal Shclk (Shiftclock) is used to move one or several light points down along the measurement axis.

The signal Pxst (Pixel start) indicates the starting point for emission of a new light point from the top of the measurement system. After the signal "Pxst" going active, a new light point will be lighted upon a first "Shclk".

The signal Px (Pixel Out) denotes that the point of light (light-point) in a module is lit. It is therefore used as a start indication in the next module upon the next "Shclk".

The signal Modst (Module strobe) is active each time there is a coupling of lightpoints between the modules. By means thereof a simple counter in the control logic of the module is able to calculate the number of lightpoints in each individual module.

The level Lm (Last module) is tested by each module in order to know whether there are several modules connected above. If the signal Lm is active, then "Pxst" is used as a start syncronization each time it occurs. The signal is held inactive by each module lying above, such that it is only the uppermost module in the array which causes the signal to be active.

The contact P1 to the module comes from the control interface 21 or from a module below. The contact P2 is connected to the next module, provided that such is present.

The block 25 in the transmitter modules denotes a shift register, e.g. an 8 bits shift register and current amplifiers to light diodes. D1–D6 denote modules of lightdiodes. Pxst arrives from the control interface 21 to start a light point from the top of the system. If the contact P2-Lmin is high, it means that the module is the uppermost in the array, and Pxst goes to the input A on the shift register 25. Upon the next Shclk-signal from the control interface 21, the uppermost diode in the lightdiodes module D1 will light. For each Shclk-pulse the light point will shift down until the last diode of the diode module D6 is lit. This occurs simultaneously with Px being transferred to the next module below, such that the next Shclk will cause the first diode there to light. Simultaneously, Modst will be active, such that the control interface 21 can calculate how many lightpoints the module contains.

It is thus understood that it is primarily tested for the total of transmitter modules in the system, whereafter the light diodes are lit in succession from the last (logical first) module in the array and in direction towards the first (logical last) module in the array, i.e. that being circuitwise closest to the control interface 21.

In the subsequent description the operation of the receiver modules will be discussed.

The signal Reset is used to stop all measurement of light in all modules and to reset all counters and control logic.

The signal Shclk (Shiftclock) is used to move one or several measurement points down along the measurement axis.

The signal Pxst (Pixel start) denotes the starting point for measurement of a new light-point from the top of the measurement system. After "Pxst" going active, a new light-point will be lit at the first "Shclk".

The signal Px (Pixel out) denotes that the last lightpoint of a module is measured. It is therefore used as a start indicator to the next module upon the next "Shclk".

The signal Modst (Module strobe) is active each time there is a coupling of measurement points between modules. By means thereof a single counter in the control logic can calculate the number of measurement points in each individual module.

The level Lm (Last module) is tested by each module in order to know whether there are several modules connected above in the array. If the signal is high, i.e. active, "Pxst" will be used as start synchronization each time it occurs. The signal is kept inactive by each module laying above, such that it is only the uppermost module in the array which will cause the signal to be active.

The signal Cbar1 (Change bar 1) is used to connect Px from the last vertical receiver module to the start of the first horizontal measurement point. The signal is cross-coupled at the transition between horizontal and vertical modules, as clearly indicated in FIGS. 4 and 5a, b. The signal is used also by the control interface to define the termination of vertical measurement axis. "bar" denotes here and below a module array in one dimension, e.g. horizontal or vertical direction.

The signal Cbar2 (Change bar 2) is used to connect Px from the last horizontal receiver module back to the control interface to define the number of modules being arranged in a horizontal direction. The signal is cross-coupled at the transition between horizontal and vertical modules.

The frequency 10 MHz is used by the receiver module internal unit 26 in which is located control logic and an internal counter to determine the read-off times for the A/D-converter connected to the light receiver elements.

Data bus part 27 of data bus 24 (D0–D7) is used for transferring digitalized measurement values from the receiver modules to the control interface 21 and the control computer 20.

The signal Cc (Conversion Complete) indicates that measurement of light-point is ready to be read by the control interface 21, i.e. that the A/D-converter has sampled the light-receiver elements. If several modules have active digitalization simultaneously, the control logic 26 of the receiver module will time-multiplex the measurement value to the data bus in priority from the top of the receiver array and downward.

The contact P1 on the receiver modules receives its inputs from the control interface 21 or from modules below. The contact P2 extends to the next module, as shown, provided that such exists. It will be suitable to arrange buffer stages associated to each module such that all signals entering into and leaving each module are amplified. A data multiplexer being included in the unit 26 will select output to the data bus 24 either from internal data or from modules located above. The A/D-converter being included in the unit 26 converts the measurement of the light-point into digital reading. In this connection it is suitable to have an amplifier and impedance matching to the analog measurement points in connection with the A/D-conversion. In the unit 26 is further included a photosensor multiplexer which is able to direct one measurement point at the time to the A/D-converter. The control logic of the module which further is included in the unit 26 both controls and synchronizes all internal logics and initiates the module below in the receiver array.

In FIG. 6 is depicted an alternative version of the system in FIG. 4 for further elucidation of the self-configuration principle of the measurement frame, according to the invention. It is in this connection also referred to FIGS. 7-12.

In FIG. 6 there is used, to the extent possible, the same references as in FIGS. 4 and 5. The control computer 20 should by suitable manipulation of transmitter/receiver module(s) be able to determine the number of diodes per module, the number of modules per array of modules (bar), and the total number of module arrays per frame.

Figure 7:
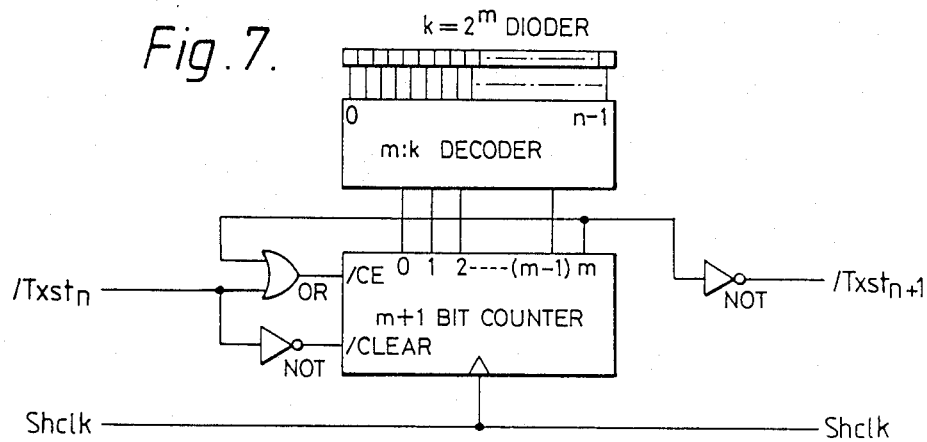
FIGS. 7, 8, 9, 10 and 11 disclose circuit details in connection with the explanation of the principle of self-configuration of the measurement frame.

In this respect there is used a diode counter, as shown in FIG. 7, CE denoting the counter enable input (Counter enable), CLEAR denoting the clear-counter input, and 0—m indicating the m+1 counter outputs.

All transmitter- and receiver modules are provided with such diode counter. This selects in succession one and one diode. The counter is incremented by the signal "Shclk" being common to all transmitter- and receiver modules. After having selected k (equal to $2^m$) diodes, the counter will activate the next counter bit (bit m) locking the counter and activating the counter on the next module.

The signal $Txst_n$ being in active state starts the diode counter on this module, and the signal $Txst_{n+1}$ in active state starts the diode counter on the next module, in direction away from the control unit 20. When the signal $Txst_n$ is inactive, the counter is zero-set and thereby inactivates the signal $Txst_{n+1}$. All of the subsequent modules (n+1, n+2) are thereby also cleared. The signals Shclk and the first Txst-signal, viz. Txst0 are generated by the control unit 20.

Figure 8:
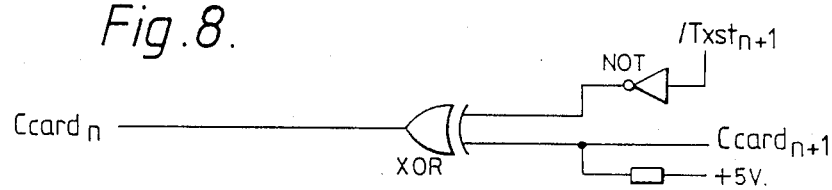

The signal Ccstr goes active each time the first diode on a module, starting with the second module is active. The control unit 20 determines the number of diodes per module by counting the number of Shclk-periods until the next Ccstr. The signal appears as indicated in FIG. 8 for transmitter module n.

$Ccard_{n+1}$ is Ccard-signal from module n+1, in a direction away from the control unit 20. Ccard means "change module" (Change card).

When $Txst_{n+1}$ goes active or $Ccard_{n+1}$ changes level, $Ccard_n$ will change level.

Figure 9:
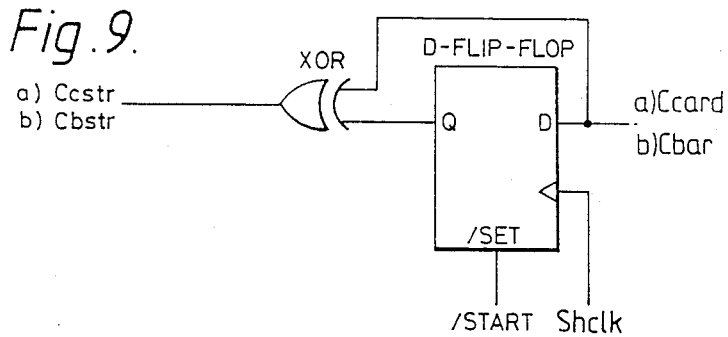

At the control unit the following takes place, reference in this respect being directed to FIG. 9 with the signal indication a. When Ccard changes level, Ccstr (which denotes Change card strobe, i.e. module-change-pulse) will be active during a Shclk-period (while a diode is active).

Figure 10:
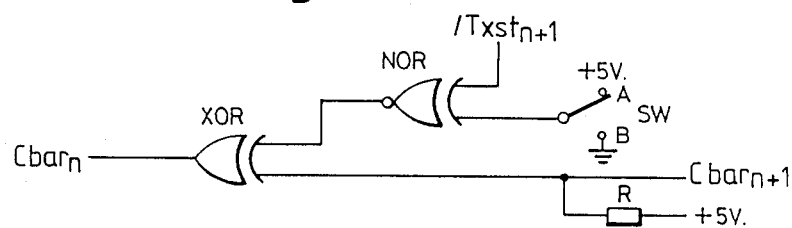

The signal Cbstr (denoting Change bar strobe, i.e. module array change pulse, in other words e.g. going from horizontal transmitter to vertical transmitter) goes active each time the first diode on a new transmitter, in FIG. 6 denoted by module array 2 (BAR 2) is active. The control unit determines the number of modules in each module array by counting the number of Ccstr-pulses to the next Cbstr-signal inclusive. The signal appears, as indicated in FIG. 10, for transmitter module n.

The signal $Cbar_{n+1}$ is signal Cbar (Cbar denoting Change bar (change module array), i.e. change transmitter orientation from e.g. horizontal to vertical) from module n+1 in direction away from the control unit 20.

The last module in the respective module array (bar) is provided with a strap which, in the example shown, is provided by means of a switch Sw in position B. When the signal $Txst_{n+1}$ goes active or $Cbar_{n+1}$ changes level, $Cbar_n$ will change level on module with switch in position B.

Figure 11:
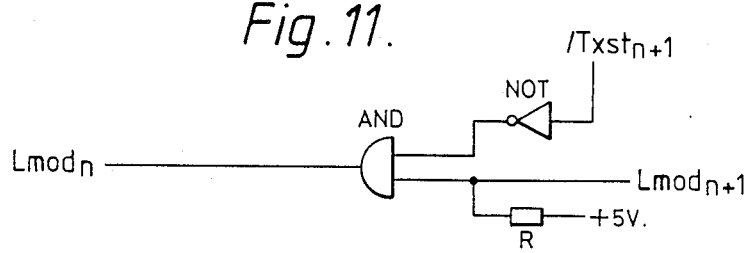
Figure 12:
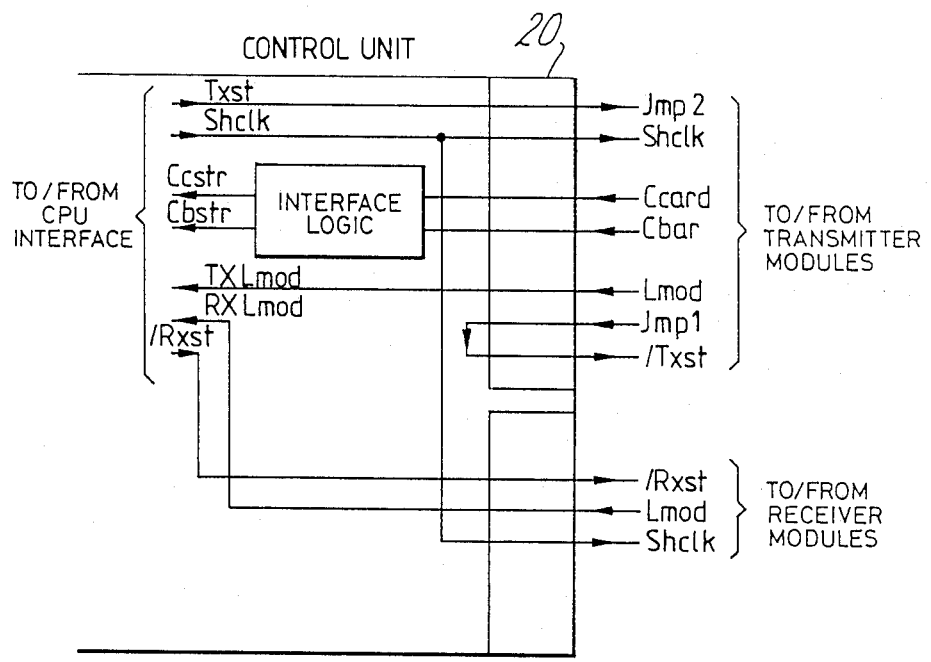
FIG. 12 illustrates the control unit of FIG. 6 in further detail.

At the control unit the following will occur as indicated in FIG. 9 by signal b. When Cbar changes level, Cbstr will be active during a Shclk-period. With further reference to FIG. 11, the signal Lmod (Last module, i.e. last module) goes active after the last diode on the last module in the frame has been active. The control unit 20 determines the number of module arrays per frame by counting the number of Cbstr-pulses until the signal Lmod is received. $Lmod_{n+1}$ is Lmod from module no. n+1, in direction away from the control unit. The module being installed farthest away from the control unit 20, in the shown case of FIG. 6 being module 6.2, has not connected thereto an active drive unit to the input $Lmod_{n+1}$ and the gate will here see a high level on $Lmod_{n+1}$ due to the resistance R to 5 V. When this module obtains active $Txst_{n+1}$, all other modules have active $Txst_{n+1}$. The signal Lmod being active will therefore go through all modules back to the control unit. The respective switch positions for the switches A and B are shown in FIG. 6. For a normal module the switch is in position A, whereas for an end module, the switch is in position B.

With the present invention a system is provided which in the transmitter part and the receiver part, respectively, consists of identical modules, whereby the transmitter- and receiver parts conveniently may be adapted to the actual measurement requirements.

By the solution shown in FIG. 6, the signal Txst-Jmp1 (denoting transmitter start signal with a jump to module array 1) will cause counting starting from module no. 3 (6.1) to module no. 4 (6.2), inclusive, whereafter the signal Txst-Jmp2 causes the module array 2 to be scanned, from module 1 to module 2, inclusive. For the receiver part the scanning will be made successively through module array 1 and 2, i.e. 7.1, 7.2, 9.1 and 9.2. In FIG. 5 the scanning, in the example shown, took place on the transmitter part from the last transmitter element in module array no. 1 to the first transmitter element in module array no. 2, and in the receiver part from the last to the first receiver element in receiver-module array no. 1, and thereafter from the last to the first receiver element in module array no. 2.

Common to both embodiments is thereby that the horizontal and vertical transmitter modules of the transmitter part signalwise are connected in series in such a manner that the scanning signal is fed directly to the logical first transmitter module, whereafter the transmitter elements in each transmitter module are selectively activated, module by module, from logical first transmitter element to logical last transmitter element in the module array, only one transmitter element and a receiver element located directly opposite in the measurement frame being activated at a time, and that the vertical receiver modules and horizontal receiver modules of the receiver part are similarly arranged in series, but signalwise such that the first module array is scanned from logical first to logical last module in the set, whereafter the outermost located module array is scanned from the logical first module to the logical last module of the array.

By "identical" modules in the transmitter- and receiver parts, respectively, is meant that respective modules are basically constructed equal, but can thereafter be provided with internal rewiring facilities, as e.g. shown by str. 1–5 in FIG. 6.

By the solution shown it is possible, dependent on the application, to configure the measurement system without restrictions by assembling a number of equal/unequal standard modules. The hardware of the measurement system is able to register how many sensors which are present in the various modules of the actual configuration and will be able to operate even in the event that a transmitter/receiver module pair does not have the same number of transmitter elements and receiver elements. The system will thus register the total length and resolution both in horisontal and vertical parts of the measurement system, as these parts, as mentioned suitably can be different.

In the measurement system of the dimension measurement discussed herein, it may be possible to let several pairs of transmitter elements/receiver elements be active simultaneously, and such can be made if the light-beam 10 from a transmitter element does not cover more than one of the active receiver elements.

It is important to note that by continuous monitoring of the velocity and the position of the object, the velocity may suitably be changed, while the measurement is in progress, without this reducing the measurement accuracy. Further, the orientation of the object during the measurement is without importance for the measurement result.

Figure 21:
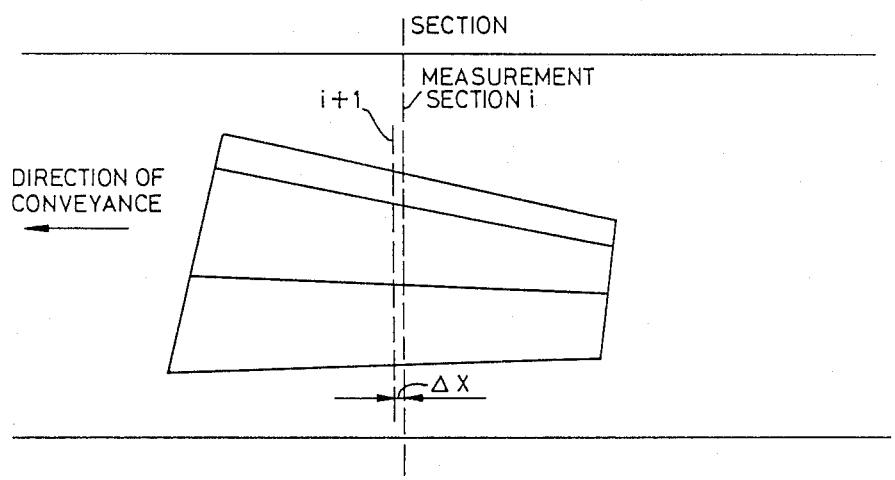
FIGS. 21 and 22 illustrate in plane view and cross-section, respectively, an increment of the volume to be measured.
Figure 22:
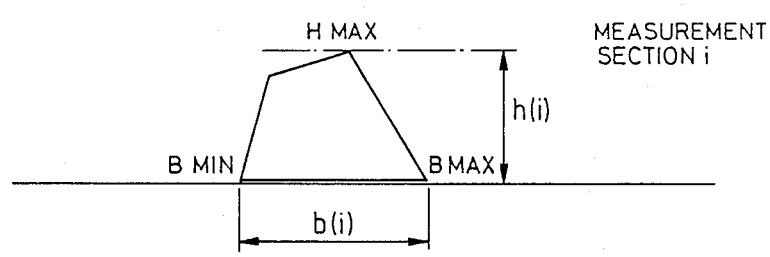

By the present invention measurements of both the cubical volume and the circumscribed volume of an object are possible. When the object passes the measuring plane, as indicated in FIGS. 21 and 22, the highest point (HMAX) will be measured at each reading based on the shadowing of the horizontal light rays. When the object passes the measuring plane, the outer right point (see FIG. 22) on the object (BMAX) and the outer left point on the object (BMIN) will be measured dependent on the shadowing of the vertical light rays. The values of HMAX, BMAX, BMIN are measured and stored for each increment $\Delta x$ which the object moves in the direction of conveyance, see FIG. 21.

The cubical volume VK is defined as the volume of the least right angled parallelepiped which encloses the object. Generally, the cubical volume will be larger than the true volume. The cubical volume VK is calculated by storing the contour positions BMAX, BMIN, HMAX for all readings over the extent of the object in the direction of conveyance. When all data are present, it will be possible by means of a suitable algorithm to read through to four points among the amount of points BMAX and BMIN, such that each of the four points lie on a side edge each of the least rectangle enclosing the vertical projection of the object. The area of this rectangle is denoted by AR. The cubical volume of the object is thus given by $VK = AR \times HMAX$, HMAX being, as mentioned, the greatest height of the object. The circumscribed volume VO is defined as the sum of partial volumes, vd, calculated over the extent of the object in the direction of movement. Thus, the circumscribed volume becomes:

$$VO = \sum_{i}^{M} vd(i)$$

where M is the total number of measurements of the object. The partial volume vd(i) in a measuring plane "i" is defined by:

$$vd(i) = h(i).b(i).\Delta x$$

where h(i) is the height of the object in the measuring plane, b(i) is the width of the object, and $\Delta x$ is the incremental distance between each measuring plane, see FIGS. 21 and 22. VO is generally larger than the true volume, but they become equal if the cross-section of the object is rectangular over its entire length.

As scanning of the transmitter element and receiver element of each module is synchronous, relatively small requirements will be set to the precision of the light emitters in the transmitter modules, so that inexpensive components can be used, as it is basically only the direct light from the light emitter in the transmitter module to the light detector in the receiver module which is detectable. With the present measurement system it is visualized that one could reach a resolution accuracy of approximately ±5 mm, when using a conveyance velocity less than approximately 30 m per minute. However, this indication of the accuracy of resolution should in no manner be considered as limitative to the present invention, but only to express a typical example.

We claim:

1. A method for the three dimensional measurement of an object to be conveyed through, or moved relative to, a measurement frame containing a plurality of transmitter elements for calculating the cubical or circumscribed volume of the object by means of incremental measurements of height, width and length of the object wherein an opposite receiver element which only detects light during the time period when the transmitter element is active is provided for each transmitter element in the measurement frame, the transmitter and receiver elements being mounted in arrays on modules with a number of the elements in each transmitter and receiver module, at least one module being present in each of two measurement directions, and an external signal which is a function of the movement of the object relative to the measurement frame being compared with data signals derived from the receiver elements for calculating said volume, said data signals being derived on a basis of shadow images on the receiver elements caused by the object, comprising the steps of:

determining for each individual receiver element or groups of receiver elements a threshold level forming criteria for determining whether the receiver element is illuminated or not;

activating the modules, which are arranged in series, by input of a start signal in the first of the modules, which signal is caused to be shifted along the interconnected modules so that at least one element is activated at a time, the start signal causing registration of a module end when it reaches the end of each module, causing registration of an end of each module array when it reaches the end of each module array for the respective measurement direction, and causing registration of the non-presence of subsequent modules in the form of a last module-signal, when it reaches an end of the interconnected module arrays;

feeding all control and data signals for the transmitter part and for the receiver part from one module to the next through tthe transmitter modules and receiver modules, respectively; and controlling said transmitter part and receiver part from a computer in which said volume is also calculated.

2. A method according to claim 1, wherein each transmitter/receiver pair is calibrated by controlling the amount of light emitted from the transmitter thereof and the threshold value at the receiver thereof so that the signal/noise ratio for the receiver thereof is above a specific limit, simultaneously with the illumination time caused to be the shortest possible.

3. A method according to claim 2, wherein the light from each transmitter element is modulated, and the receiver elements are made sensitive only to such modulated light.

4. A method according to claim 2, wherein the mutual velocity of the object and the measurement frame is altered while the measurement is in progress.

5. A method according to claim 2, wherein the transmitter/receiver elements of the measurement frame make use of visible light.

6. A method according to claim 2, wherein at least two transmitter/receiver element pairs are activated simultaneously.

7. A method according to claim 2, wherein the transmitter/receiver modules output as a result of said start signal electrical control signals indicating the positioning in the measurement system of the respective modules and characteristics thereof, the transmitters are made operative in succession from a logical first transmitter element in the first transmitter module to a logical last transmitter element in the last transmitter module, a first control signal is sent to the computer when the start signal reaches the end of the first transmitter module, a second control signal when the start signal reaches the end of each module array for each respective measurement axis, and a third control signal when the start signal reaches the end of the interconnected modules arrays, i.e. the end of the last module array, the control signals coming from the modules being characteristic of the composition, form and size of the measurement system, and the computer controlling the modules not required to be preprogrammed to know the geometry of the measure system.

8. A method according to claim 2, wherein horizontal and vertical transmitter modules of the transmitter part are signalwise connected in series so that a scanning signal is fed directly to a logical first transmitter module in the module array, whereafter the transmitter elements of each transmitter module are selectively activated module by module, from logical first transmitter element to logical last transmitter element in the module array, only one transmitter element and a receiver element in the measurement frame located right opposite one another being activated at a time, and the vertical receiver modules and horizontal receiver modules of the receiver part similarly being connected in series, but signalwise such that the first module array therein is first scanned from the logical first to the logical last module thereof, whereafter the outermost module array is scanned from logical first module to logical last module thereof.

9. A method according to claim 2, wherein the transmitter/receiver elements of the measurement frame make use of invisible light.

10. A method according to claim 1, wherein the emitted amount of light from each transmitter is determined by controlling the intensity of the light being emitted during the active period thereof.

11. A method according to claim 1, wherein the light from each transmitter element is modulated, and the receiver elements are made sensitive only to such modulated light.

12. A method according to claim 1, wherein the mutual velocity of the object and the measurement frame is altered while the measurement is in progress.

13. A method according to claim 1, wherein the transmitter/receiver elements of the measurement frame make use of visible light.

14. A method according to claim 1, wherein at least two transmitter/receiver element pairs are activated simultaneously.

15. A method according to claim 1, wherein the transmitter/receiver modules output as a result of said start signal, electrical control signals indicating the positioning in the measurement system of the respective modules and characteristics thereof, and the transmitters are made operative in succession from a logical first transmitter element in the first transmitter module to a logical last transmitter element in the last transmitter module, a first control signal is sent to the computer when the start signal reaches the end of the first transmitter module, a second control signal when the start signal reaches the end of each module array for each respective measurement axis, and a third control signal when the start signal reaches the end of the interconnected module arrays, i.e. the end of the last module array, the control signals coming from the modules being characteristic of the composition, form and size of the measurement system, and the computer controlling the modules not required to be preprogrammed to know the geometry of the measurement system.

16. A method according to claim 1, wherein:
horizontal and vertical transmitter modules of the transmitter part are signalwise connected in series so that the scanning signal is fed directly to a logical first transmitter module in the module array, whereafter the transmitter elements of each transmitter module are selectively activated module by module, from a logical first transmitter element to a logical last transmitter element in the module array, only one transmitter element and a receiver element in the measurement frame located right opposite being activated at a time, and the vertical receiver modules and horizontal receiver modules of the receiver part similarly being connected in series, but signalwise such that the first module array is first scanned from the logical first to the logical last module thereof, whereafter the outermost module array is scanned from logical first module to logical last module thereof.

17. A method according to claim 1, wherein the external signal is supplied from a tacho generator, and the value of the volume calculated by the computer is supplied to a display device.

18. A method according to claim 1, wherein the emitted amount of light from each transmitter is determined by controlling the duration of the light being emitted during the active period of the transmitter element-/receiver element.

19. A method according to claim 1, wherein the transmitter/receiver elements of the measurement frame make use of invisible light.

* * * * *